C. H. KUGLER.
AIRPLANE.
APPLICATION FILED FEB. 9, 1920.
1,371,493.
Patented Mar. 15, 1921.
2 SHEETS—SHEET 2.
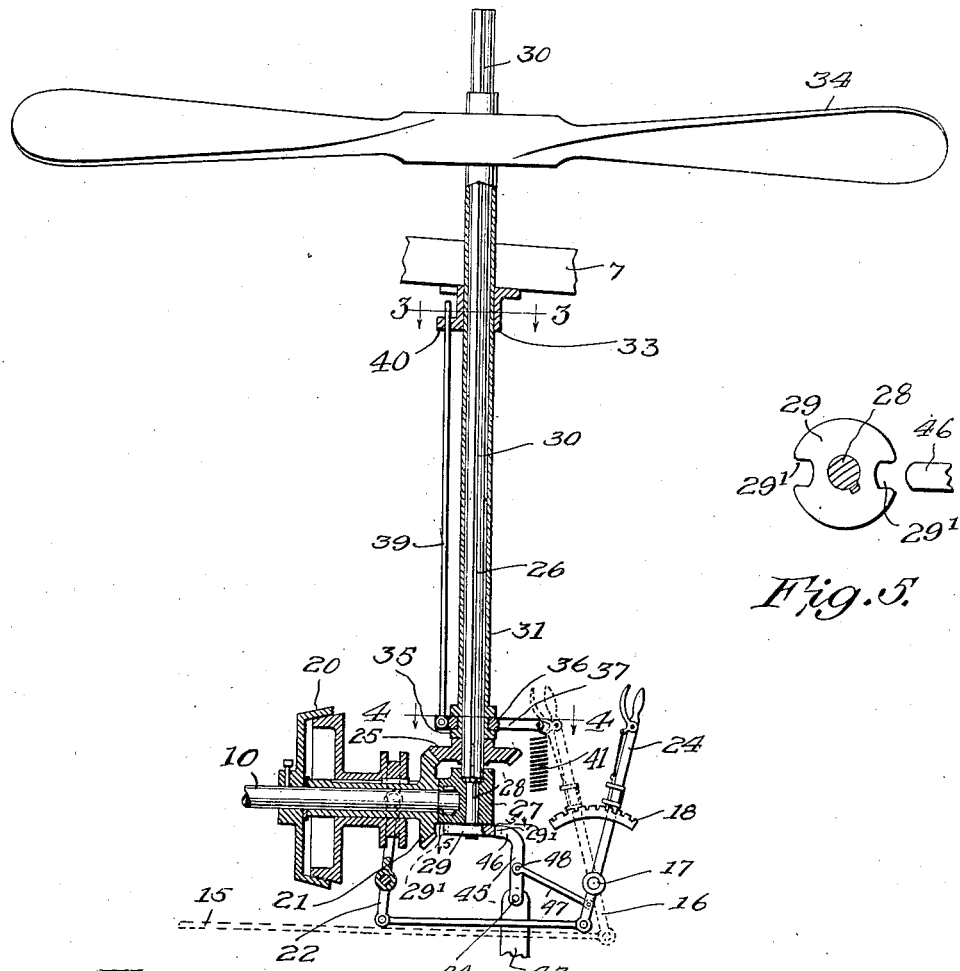
Fig. 2.
Fig. 5.
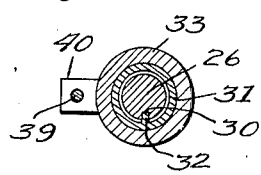
Fig. 3.
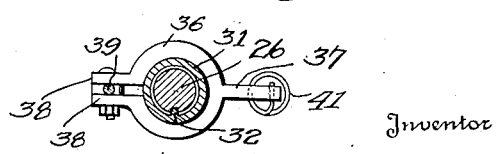
Fig. 4.
Inventor
Charles H. Kugler
By his attorneys
Baldwin Wight

UNITED STATES PATENT OFFICE.

CHARLES H. KUGLER, OF LEXINGTON, NEBRASKA.

AIRPLANE.

1,371,493.  Specification of Letters Patent.  Patented Mar. 15, 1921.

Application filed February 9, 1920. Serial No. 357,377.

*To all whom it may concern:*

Be it known that I, CHARLES H. KUGLER, a citizen of the United States, residing at Lexington, in the county of Dawson and State of Nebraska, have invented certain new and useful Improvements in Airplanes, of which the following is a specification.

My invention is an improvement in airplanes and relates to airplanes of the type in which a vertical propeller is employed in addition to the usual horizontal propeller or tractor whereby the machine may be made to move in a substantially vertical direction as a heliocopter, or at the will of the operator, may be navigated in the usual manner of the ordinary airplane.

The object of my invention is to so mount the vertical propeller that it may normally be so disposed on the airplane as to offer a minimum wind resistance and which will normally lie in a direction longitudinal of the travel of the plane, but which, when functioning, will be automatically moved to a position above the planes to give the most efficient results for moving the airplane in a vertical direction.

A further object of my invention is to so arrange and construct the various parts that they may be readily installed on standard airplanes without undue complication and to permit of the control therefor being convenient to the seat of the operator, the parts being so made that a minimum weight will be added when my invention is applied to the machine.

According to my invention, an airplane of any standard or preferred construction is provided with a suitable engine in the usual position on the fuselage. One end of the driving shaft of the engine is coupled to a propeller by means of a clutch, the clutch being operable from the driver's seat by means of a lever with suitable connections. The opposite end of the shaft may be employed to drive a bevel gear through a clutch connection which also may be controlled from the driver's seat. A telescoping vertical shaft is supported in the machine with a bevel gear on its driving end in mesh with the bevel gear on the engine shaft. The propeller is keyed near the opposite end of the telescoping vertical shaft, the arrangement being such that in operation the vertical propeller automatically moves several feet above the supporting planes of the machine in order to obtain better results than could be obtained if the propeller were maintained in its normal position adjacent the surface of the supporting plane. A spring is preferably employed to retract the propeller when the driving connection is disengaged.

The construction and arrangement of parts will be more fully described by reference to the accompanying drawings in which:

Fig. 2 is a vertical section through the mechanism for operating the vertical propeller.

Fig. 3 is a section on line 3—3 of Fig. 2.

Fig. 4 is a section on line 4—4 of Fig. 2.

Fig. 5 is a section on line 5—5 of Fig. 2.

Figure 1:
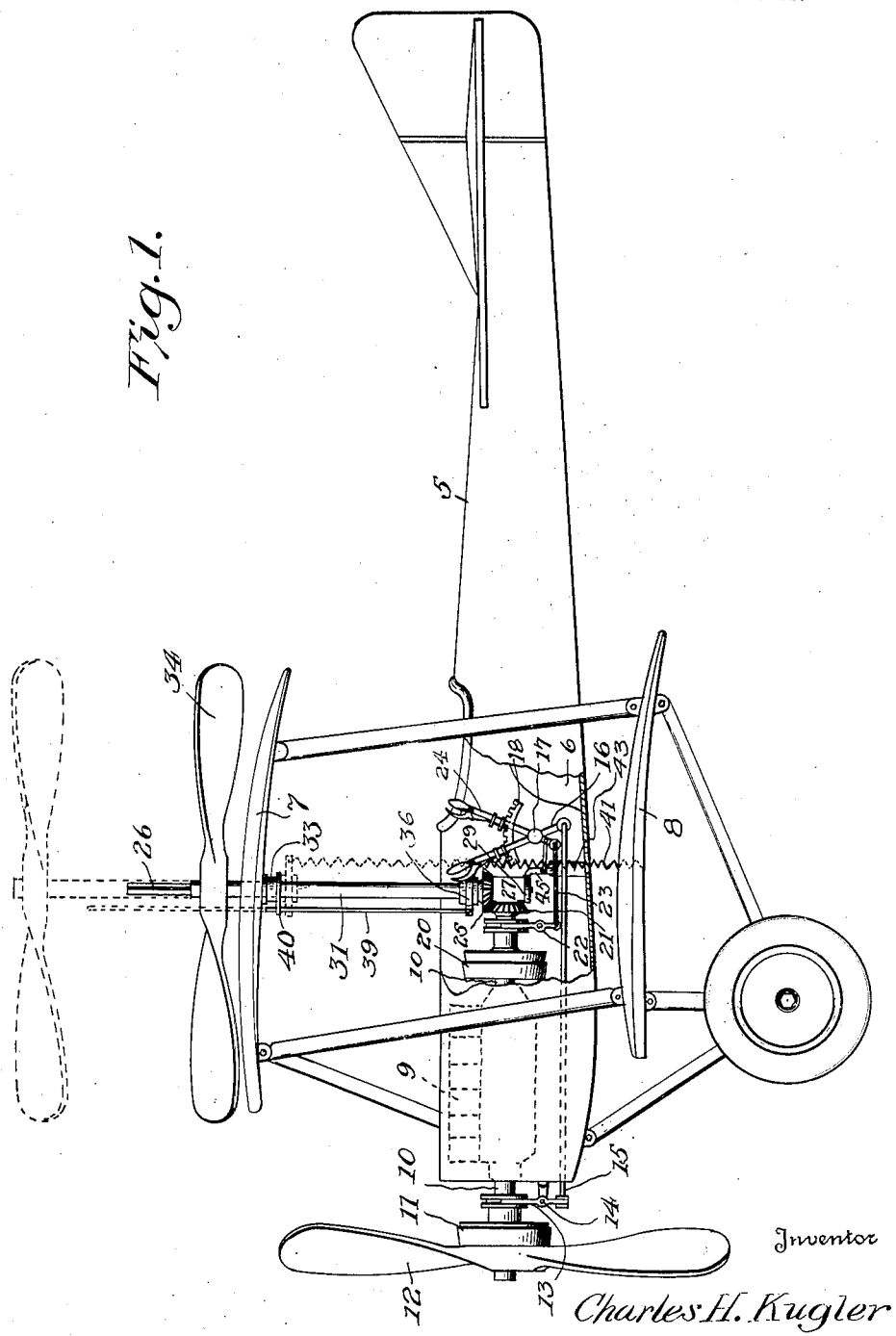
Figure 1 is a side elevation showing an airplane equipped with my invention.

In the drawings is shown a conventional form of airplane of the tractor type having a body or fuselage 5 with a driver's seat 6 and upper and lower supporting planes 7 and 8, respectively. Indicated in dotted lines in the forward part of the fuselage is an engine 9 having a driving shaft 10 projecting from each end thereof. At the forward end of the shaft 10 is a clutch 11, such as a sliding cone clutch, for driving the propeller or tractor 12. The clutch 11 may be operated by means of a lever 13 pivoted at 14, carrying a shifting yoke at one end, and pivotally connected at its opposite end to a link 15 which in turn is pivotally connected to a hand lever 16 near the driver's seat. The hand lever is of known construction, pivoted at 17 and having a releasable catch engaging a toothed segment 18.

On the opposite end of the shaft 10 is a clutch 20 similar to clutch 11 for driving the bevel gear 21. Similar clutch operating means is provided by the pivoted yoke 22, link 23 and hand lever 24 also pivoted at 17. The hand lever 24 is likewise provided with a catch for engaging the toothed segment 18.

Meshing with the bevel gear 21 is a second gear 25 keyed to the vertical shaft 26. The shaft 26 is rotatably supported in a bearing 27 and has a reduced portion 28 carrying a collar 29 notched at 29' as shown in Fig. 5. The entire length of the shaft 26 above the bearing is provided with a key slot or groove 30. Surrounding the shaft 26 is a hollow shaft 31 adapted to be driven by the shaft 26 by means of a key 32 extending throughout the greater portion of its length and engaging the groove 30. The shaft 31 is slidably guided in a bearing 33 supported in the upper plane 7. By this construction a telescoping driving shaft is provided for the propeller 34 which is keyed or otherwise suitably fixed on the hollow shaft 31.

On the lower end of the hollow shaft 31 is a pair of flanges 35 forming a groove therebetween in which is carried a ring 36 having a rearwardly extending arm 37, and ears 38 between which is pivoted a guide rod 39 slidably passing through lug 40 on the bearing 33. Connected to the arm 37 and to the lower plane or other suitable part of the machine is a tensioning device 41, preferably comprising a coil spring as shown, the tension device tending normally to urge the shaft 31 downwardly by means of the ring engaging the annular groove between the flanges 35 on the shaft 31. The guide rod 39 acts to prevent the ring from turning with the hollow shaft whereby the spring 41 is prevented from becoming twisted or turned into possible engagement with the gears.

Pivoted to a bracket 43 at 44 is an arm 45 having its upper end formed into a finger 46 adapted to enter a notch 29' in the collar 29. The notches and finger are so alined with the propeller 34 that when the finger enters a notch the propeller is in longitudinal alinement with the fuselage, and the finger and collar form a detent for holding it in that position. In such longitudinal position the propeller can offer the least wind resistance to forward progress. For releasing the detent when it is desirable to operate the propeller 34 I have shown a link 47 pivoted to the arm 45 at 48 and to the hand lever 34 below the pivot 17. Thus when the clutch is disengaged the finger will be forced into one of the notches and vice versa.

Assuming that it is desirable to lift the machine vertically, the hand lever 24 is operated to move the clutch 20 into driving connection, this movement also releasing the detent finger 46, the clutch 11 at this time being disengaged. The gear 21 will then be operated to thereby drive the propeller 34 through gear 25, shaft 26 and the keyed hollow shaft 31. This rotation of the propeller would first cause it to rise several feet above the supporting plane 7 until stopped by the upper flange 35 coming against bearing 33, placing the spring 41 under tension. The spring 41 also acts as a brake during the time the propeller is rising to prevent it from rising so rapidly as to cause damage to any part of the machine, as might otherwise be the case in the event the clutch were thrown suddenly into operative position when the engine is running at high speed. When in this elevated position the propeller 34 acts to raise the airplane in a vertical direction. By so elevating the propeller above the supporting plane 7 the lifting force is not so strongly counteracted by the air forced downwardly by the propeller.

After a sufficient height has been attained the driver may disengage the clutch 20 and render clutch 11 efficient to drive the tractor 12. Although I have shown a tractor, the propeller 12 might be a "pusher." Upon the clutch 20 being rendered inoperative the spring 41 acts to retract the propeller 34 to its lowermost position and the detent 46 is forced into one of the notches 29' to hold the propeller 34 in longitudinal position. It is possible with my construction to drive both propellers simultaneously or either one separately and it is not necessary to disengage one until the other has become effectively operative.

It will be apparent that the propeller 34 may be used in making a vertical descent as well as ascent, in the manner well understood in the art of heliocopter construction and operation.

I claim as my invention:—

1. The combination with an airplane having a body and supporting planes, of a vertically acting propeller therefor, means for driving said propeller, automatic extensible means normally retaining the vertically acting propeller close to the level of one of the supporting planes when the propeller shaft is not rotated, and which permits said propeller to be extended above the level of the same supporting plane when said propeller is being driven.

2. The combination with an airplane of a vertically acting propeller therefor, a telescopic shaft for said propeller, automatic, extensible means for normally holding said shaft in retracted position with the propeller in its lowermost position, means applied to the telescopic shaft for rotating it and the propeller with it, automatic, extensible means for holding the propeller in its lowermost position but which permit the propeller to rise when rotated, and means for locking the propeller in its lowermost position when the rotating means is disconnected.

3. The combination with an airplane having a body and planes, of a vertically acting propeller therefor, means for driving the propeller, means normally retaining the vertically acting propeller close to the level of one of the planes, automatic means permitting the propeller to extend beyond the level of the same plane when the propeller is being driven, and means for normally holding the propeller when inoperative in longitudinal alinement with the body of the airplane.

4. The combination with an airplane having a body, supporting planes and horizontally acting propeller and driving means therefor of a vertically acting propeller, driving means therefor, means for rendering the last mentioned driving means operative, means for normally holding the vertically acting propeller in longitudinal alinement with the body of the airplane, said means being rendered inoperative when the vertically acting propeller is rendered operative.

5. The combination with a airplane, having a body and supporting planes, of a vertically acting propeller therefor, means for driving the propeller, means comprising a spring for normally retaining the vertical propeller close to the level of one of the supporting planes and which automatically permits the propeller to be extended above the level of said plane when the propeller is being driven.

6. In combination with an airplane having a body and supporting planes, a driving engine, a horizontally acting propeller, a clutch between the engine and propeller of a vertically acting propeller, an extensible shaft for driving said propeller, a driving connection between the extensible shaft and said engine, a clutch in the driving connection, means normally holding the extensible shaft in retracted position, said shaft being extended when the propeller is driven, and means for effecting the operation of said clutches to control the operation of the two propellers.

7. The combination with an airplane having a body and supporting planes, of a vertically acting propeller therefor, mounted to rise and fall relatively to the horizontal axis of the plane, a motor for driving said propeller, means for connecting and disconnecting the propeller with the motor, a locking device for holding the propeller against rotation when in its lowermost position, and means for simultaneously withdrawing the locking device and connecting the propeller with the driving motor.

In testimony whereof, I have hereunto subscribed my name.

CHARLES H. KUGLER.

In presence of—
N. M. Cook.